March 10, 1959　　W. M. HALLIDY　　2,877,402
ALTERNATOR-RECTIFIER ELECTRICAL GENERATING SYSTEM
Filed July 19, 1955　　3 Sheets-Sheet 1

INVENTOR.
WILLIAM M. HALLIDY
BY Hudson, Boughton,
Williams, David & Hoffmann
ATTORNEYS March 10, 1959     W. M. HALLIDY     2,877,402
ALTERNATOR-RECTIFIER ELECTRICAL GENERATING SYSTEM
Filed July 19, 1955     3 Sheets-Sheet 2

INVENTOR.
WILLIAM M. HALLIDY
BY Hudson Broughton,
Williams, David & Hoffmann
ATTORNEYS March 10, 1959 W. M. HALLIDY 2,877,402
ALTERNATOR-RECTIFIER ELECTRICAL GENERATING SYSTEM
Filed July 19, 1955 3 Sheets-Sheet 3

INVENTOR.
WILLIAM M. HALLIDY
BY Hudson Boughton,
Williams, David & Hoffmann
ATTORNEYS

United States Patent Office 2,877,402
Patented Mar. 10, 1959

2,877,402

ALTERNATOR-RECTIFIER ELECTRICAL GENERATING SYSTEM

William M. Hallidy, Lakewood, Ohio, assignor to The Leece-Neville Company, Cleveland, Ohio, a corporation of Ohio Application July 19, 1955, Serial No. 522,911

9 Claims. (Cl. 320—28)

This invention relates to generating systems of the alternator-rectifier type, and more particularly, to the control of the load relay employed in such a system for connecting a polyphase alternator with the external load. This application is related as to subject matter to application Serial No. 506,572 filed May 6, 1955 and now Patent 2,789,265 granted April 16, 1957.

In generating systems of the alternator-rectifier type, which include a storage battery to be charged as a portion of an external load connected with a polyphase alternator, the load circuit is usually connected with the direct current terminals of the power rectifier through a load relay. In such a system it is desirable that the load relay be under the control of the alternator so that the relay will close and open automatically in response to a predetermined terminal voltage output value of the alternator.

The most economical way of automatically closing the load relay in response to the operation of the alternator, would be to energize the load relay magnet coil by a portion of the direct current output of the power rectifier, but when the load relay coil is energized in this way, the opening of the load relay is no longer under the control of the alternator. This results from the fact that as soon as the relay contacts are closed by the alternator output voltage, its magnet coil will then be subject to energization from the battery and will hold the contacts closed after the output voltage drops to zero value.

To accomplish the desired automatic control of the load relay by the alternator, it has heretofore been necessary to provide the system with an auxiliary or control rectifier as is shown in United States Patent No. 2,646,-543, granted July 21, 1953, for connecting the load relay magnet coil with the alternator. Such a control rectifier has added considerably to the cost of generating systems of this kind.

As its principal object, the present invention therefore provides a novel generating system of the alternator-rectifier type in which the above-explained cost disadvantage is overcome, and in which the closing and opening of the load relay is automatically responsive to the operation of a polyphase alternator by the load relay magnet coil being connected with phase windings of the alternator through control resistors.

Another object is to provide a novel alternator-rectifier generating system in which the load relay magnet coil is energized from the phase windings of the alternator through such control resistors while a portion of the power rectifier is utilized as a blocking means to prevent energization of the relay magnet coil from the storage battery of the external load circuit.

Still another object is to provide such a generating system in which the energization of the load relay magnet coil from the phase windings and through such control resistors, also takes place through one portion of the power rectifier, which is preferably a multiple-cell full-wave rectifier, while another portion of the power rectifier prevents energization of the relay magnet coil from the battery of the load circuit.

Additionally, this invention provides such an alternator-rectifier generating system in which the magnet coil of the load relay has one end thereof connected with phase windings of the alternator through control resistors and has its other end connected with one of the direct current load terminals of the power rectifier, and in which the connection for such other end of the magnet coil can be either a grounded or ungrounded connection.

Other objects and advantages of this invention will be apparent in the following detailed specification and in the accompanying sheets of drawings forming a part thereof and in which.

Figure 2:
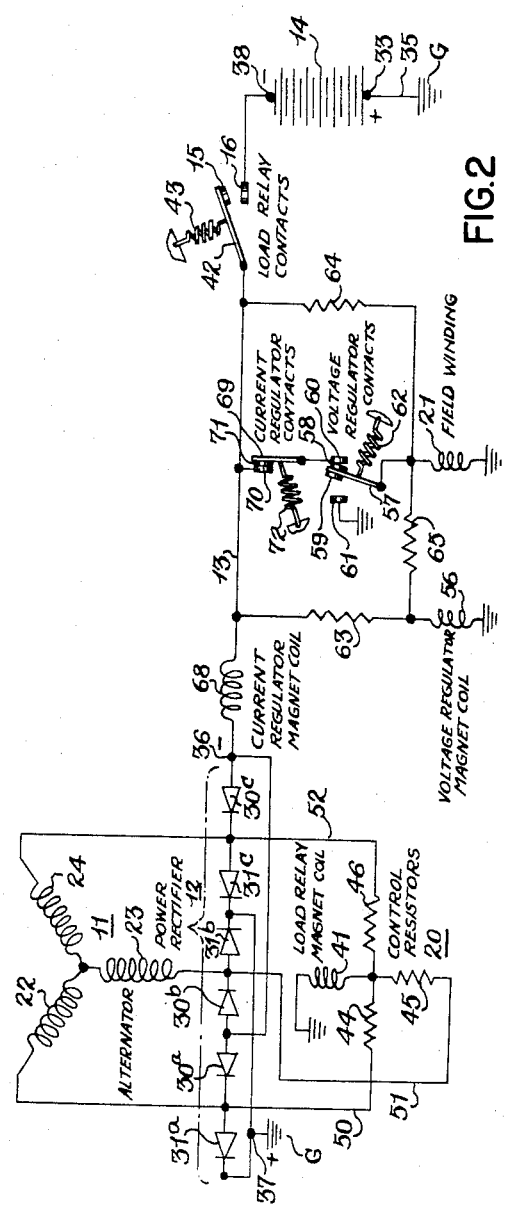
Fig. 2 is a schematic wiring diagram of the generating system of Fig. 1.
Figure 9:
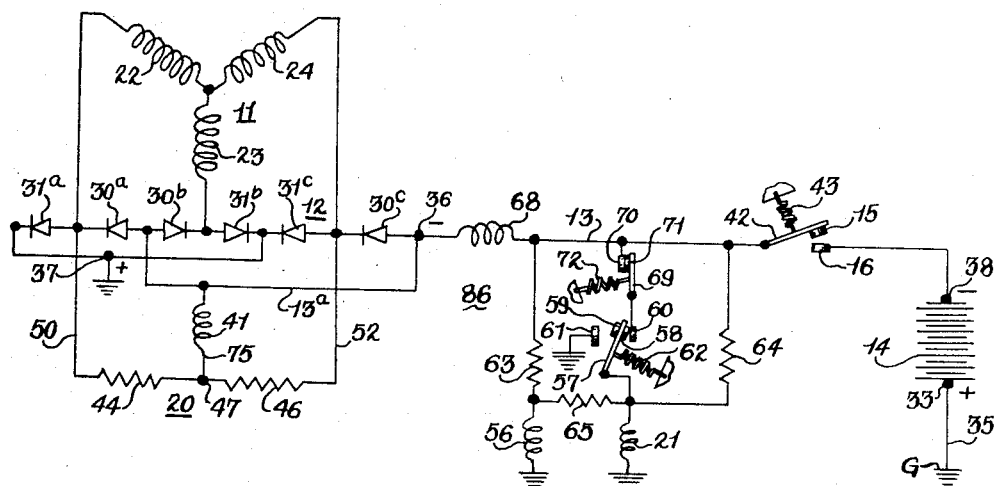
Figure 8:
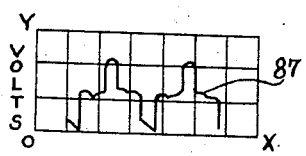
Figure 10:
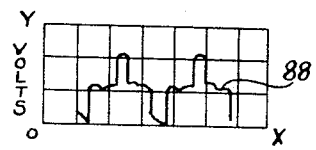
Figure 5:
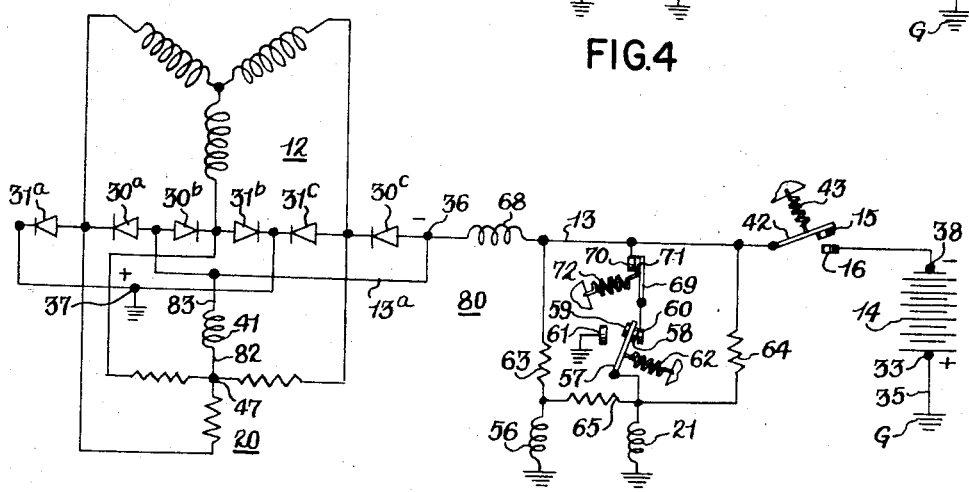
Fig. 5 is a schematic wiring diagram illustrating a generating system similar to that of Figs. 1 and 2, but employing a different circuit for the load relay magnet coil.
Figure 7:
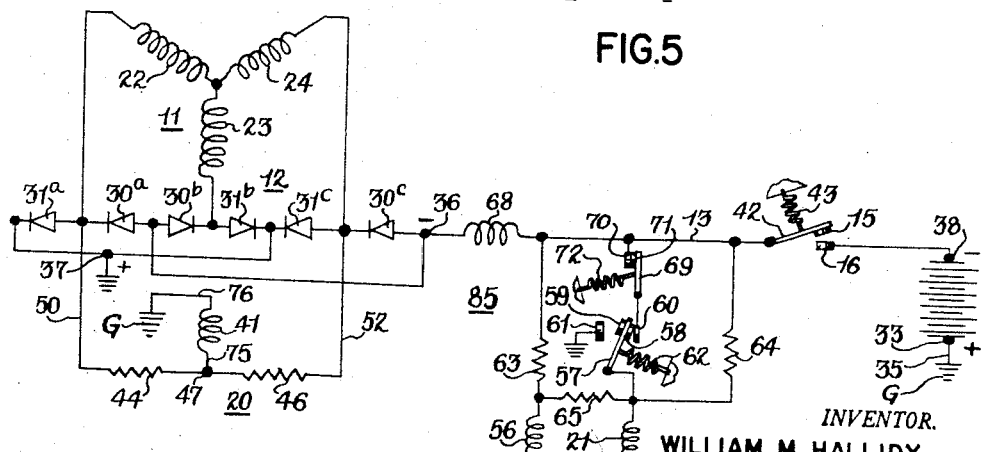

Figs. 7 and 9 are schematic wiring diagrams illustrating generating systems similar to those of Figs. 2 and 5, respectively, but in which a smaller number of control resistors are used in the load relay control circuit; and Figs. 8 and 10 are graphs illustrating the wave form for the relay magnet coil current in the generating systems of Figs. 7 and 9 respectively.

Figure 1:
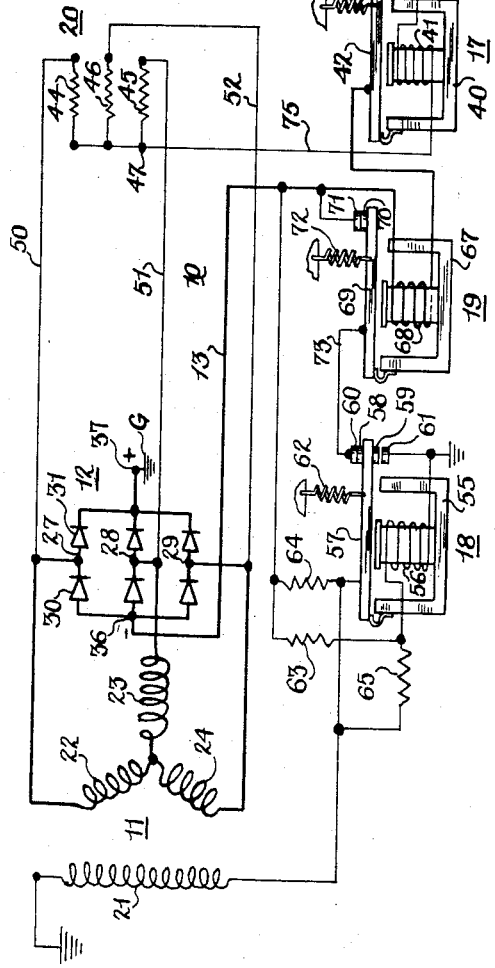
Fig. 1 is a wiring diagram illustrating an alternator-rectifier electrical generating system embodying the present invention, and in which the load relay magnet coil is connected with the phase windings of the alternator through control resistors.

As one practical embodiment of this invention, Fig. 1 illustrates a generating system 10 having an alternator 11 connected with an external direct current load through a main or power rectifier 12, and through a load conductor 13 and a common ground G. The external load includes a storage battery 14 which is connected with the power rectifier 12 by the conductor 13 through the series contacts 15 and 16 of a load relay 17.

Other components of the generating system 10 include voltage and current regulators 18 and 19 of the relay type for controlling the operation of the alternator 11, and a control unit 20 serving the load relay 17. These various components of the generating system 10 and their functioning therein will be further described hereinafter.

The alternator 11 is here shown as being a three-phase alternator having a field winding 21 and inductor windings 22, 23 and 24. The inductor windings 22, 23 and 24 are here shown as being Y-connected.

The power rectifier 12 is a three-phase full-wave multiple-cell rectifier of the dry-plate type and is here shown as having three parallel circuit arms 27, 28 and 29 with which the inductor windings 22, 23 and 24 of the alternator 11 are connected, respectively. Each of the circuit arms 27, 28 and 29 has a pair of rectifier cells 30 and 31 therein and the connection of each inductor winding of the alternator with its associated circuit arm of the rectifier is made at a point between such pair of rectifier cells.

The generating system 10 is here shown as being a system of the so-called positive-ground type in which the positive terminal 33 of the storage battery 14 is connected to the common ground G by the conductor 35. The power rectifier 12 further includes direct current load terminals 36 and 37 of which the terminal 37 is a positive terminal and is connected to the common ground. The negative direct current terminal 36 of the power rectifier 12 is connected with the negative terminal 38 of the battery 14 through the load conductor 13.

The load relay 17 is a conventional load relay comprising a magnet frame 40 having an energizing coil 41 thereon, and an armature 42 carrying the movable switch contact 15 and responsive to the energization of the magnet coil 41. The load relay contacts 15 and 16 are normally open for disconnecting the battery 14 from the alternator 11 and such open condition of these contacts is normally maintained by the tension spring 43. The energization of the load relay magnet coil 41, as provided by this invention, will be explained hereinafter.

The voltage regulator 18 can be of a conventional form and is here shown as being of the kind disclosed in and covered by United States Patent 2,520,689, granted August 29, 1950. The voltage regulator 18 comprises a frame 55 having a voltage magnet coil 56 thereon, and a vibratory armature 57 carrying movable switch contacts 58 and 59 which cooperate, respectively, with upper and lower stationary contacts 60 and 61. A tension spring 62 effective on the armature 57 urges the same toward a normally closed condition for the cooperating contacts 58 and 60.

The voltage regulator 18 also comprises a ballast resistor 63 in series circuit with the magnet coil 56, a point resistor 64 in shunt relation to the upper pair of cooperating contacts 58 and 60, and a secondary resistor 65 which assists the ballast resistor 63 in controlling the energization of the magnet coil 56.

The current regulator 19 can also be a conventional form of such a device and is here shown as comprising a magnet frame 67 having a series magnet coil 68 thereon, and a vibratory armature 69 carrying a movable switch contact 70 which is urged toward a normally closed engagement with a stationary contact 71 by the action of a tension spring 72 on the armature.

The point resistor 64 of the voltage regulator 18 also serves as a point resistor in shunt relation to the cooperating contacts 70 and 71 of the current regulator 19. The point resistor 64 and the voltage and current regulator contacts 58, 60, and 70, 71 are in the field circuit of the alternator 11 and control the energization of the field winding 21 in accordance with the terminal voltage and current output values of the alternator, as is understood by those skilled in this art.

The lower stationary voltage regulator contact 61 is connected with the common ground G and the upper stationary voltage regulator contact 60 is connected with the movable current regulator contact 70 by the conductor 73. Although the functioning of the voltage and current regulators 18 and 19 in controlling the operation of the alternator 11 is generally understood by those skilled in this art and need not be here described in detail, it can be mentioned, however, that whenever the contacts 58 and 60 of the voltage regulator and the contacts 70 and 71 of the current regulator 19 are in a closed condition at the same time, the point resistor 64 is short-circuited out of the energizing circuit of the field winding 21. Whenever the voltage regulator contacts 58 and 60 or the current regulator contacts 70 and 71 are open, the point resistor 64 is in series circuit with the field winding 21. Likewise, it can be mentioned that whenever the lower voltage regulator contacts 59 and 61 are closed, the field winding 21 is substantially short-circuited for collapsing the field excitation.

In accordance with the present invention, the load relay magnet coil 41 is energized from the alternator 10 through the control unit 20 and through a portion of the power rectifier 12. The control unit 20 is a resistor unit and will be described next.

The control unit 20 comprises a group of resistors, in this instance three such resistors 44, 45 and 46, which are disposed in a parallel relation in the energizing circuit of the load relay magnet coil 41. The resistors 44, 45 and 46 are simple resistors of a suitable resistance value and are substantially identical.

The three control resistors 44, 45 and 46 are connected on one side thereof with the inductor windings 22, 23 and 24 of the alternator 11 by the conductors 50, 51 and 52, respectively. The control resistors 44, 45 and 46 are connected on the other side thereof with a common control current terminal 47.

The energizing circuit of the load relay magnet coil 41 is connected with the alternator 11 by one end of the 41 relay magnet coil, being electrically connected directly with the common control current terminal 47 of the unit 20 by the conductor 75. The other end of the magnet coil 41 is connected with the direct current terminal 37 of the power rectifier 12 through the conductor 76 and the common ground G.

From the construction and functioning of the components of the generating system 10 as thus far described, it will be seen that when the alternator 11 is not being driven, the load relay contacts 15 and 16 will be held open by the spring 43 to thereby disconnect the battery 14 from the alternator. When the alternator is placed in operation as by the starting of the vehicle driving engine, the load relay magnet coil 41 will be energized by the alternator through the control unit 20 and through a portion of the power rectifier 12 to thereby automatically close the load relay contacts 15 and 16 and connect the external load in circuit with the alternator through the power rectifier.

To explain further how the load relay magnet coil 41 is suitably energized from the alternator through the control unit 20 and the power rectifier 12, it is pointed out that when the alternator is placed in operation current flows from the phase windings 22, 23 and 24 through the rectifier cells 31 to the direct current load terminal 37 and then through the common ground G and the conductor 76 to the load relay coil. From the coil 41 the current flows through the conductor 75 to the common terminal 47 of the control unit 20, and then back to the phase windings of the alternator through the resistors 44, 45 and 46 and the conductors 50, 51 and 52.

From the energizing circuit as just above traced for the load relay magnet coil 41, it will be seen that the cells 31ª, 31ᵇ and 31ᶜ of the power rectifier 12 are included in this circuit as conducting cells and that the cells 30ª, 30ᵇ and 30ᶜ are serving at the same time as blocking cells. These blocking cells prevent energization of the magnet coil 41 from the storage battery 14 when the load relay contacts 15 and 16 have been closed in response to operation of the alternator.

Figure 3:
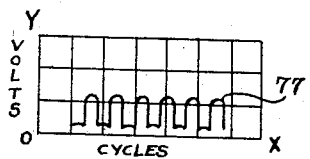
Fig. 3 is a graph illustrating the wave form obtained in the generating system of Fig. 1 for the energizing current supplied to the load relay magnet coil.

From the energizing circuit above described for the magnet coil 41 of the load relay 17, it will now also be seen that by the use of the relatively simple and inexpensive resistor 20 in conjunction with the power rectifier 12, satisfactory energization of the load relay under the control of the alternator 11 is obtained. This satisfactory energization of the load relay magnet coil from the alternator 11 with relatively reduced cost is further illustrated by the graph of Fig. 3 in which the wave from curve 77 illustrates the voltage characteristic of this energizing current. The curve 77 represents two cycles of operation of the alternator 11 and was plotted relative to the zero value horizontal axis OX in accordance with voltage values shown by an oscilloscope to exist in the load relay magnet coil circuit during the functioning of the generating system 10.

Figure 4:
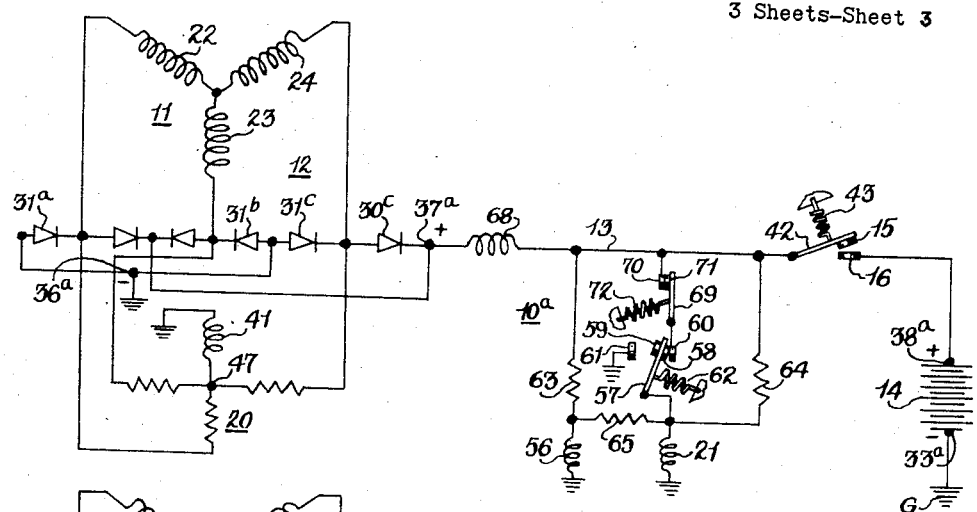
Fig. 4 is a schematic wiring diagram illustrating the same generating system as Fig. 1 but as a negative-ground form of the system.

The schematic wiring diagram of Fig. 4 shows an alternator-rectifier generating system 10ª which is substantially the same in structure and function as the above-described generating system 10 but which is a negative-ground type of system. In this negative-ground system 10ª, the negative and positive direct current terminals of the power rectifier are designated 36ª and 37ª, and the negative and positive terminals of the battery 14 are designated 33ª and 38ª.

In the system 10ª, all of the rectifier cells of the power rectifier 12 are shown in a position reversed from Fig. 2 inasmuch as this system is of the negative-ground type. The wave form of the energizing current of the load relay magnet coil 41 in the negative-ground system of Fig. 4 is the same as is represented by the curve 77 of the graph shown in Fig. 3.

Fig. 5 of the drawings shows an alternator-rectifier generating system 80 which is similar to the generating system 10 of Figs. 1 and 2 and similar to the generating system 10ª of Fig. 4, in that the energizing circuit for the magnet coil 41 of the load relay 17 is connected with the alternator 11 through the control unit 20 and through a portion of the power rectifier 12.

However, in the generating system 80, one end of the energizing circuit for the load relay magnet coil 41 is directly connected with the common terminal 47 of the control unit 20 by the conductor 82. The other end of this energizing circuit is connected with the alternator through a portion of the load conductor and through the conductor 83. The portion of load conductor through which this magnet coil circuit extends is represented in the schematic diagram of Fig. 5 by the circuit arm 13ª.

In the generating system 80 of Fig. 5 it will also be seen that portions of the power rectifier 12 are included in the energizing circuit for the load relay magnet coil 41, in that the cells 30ª, 30ᵇ and 30ᶜ are in series circuit with the phase windings and the load relay magnet coil. Energization of the load relay coil from the battery 14 is prevented when the load relay contacts 15 and 16 have been closed, by the cells 31ª, 31ᵇ and 31ᶜ of the power rectifier 12 which then act as blocking cells.

Figure 6:
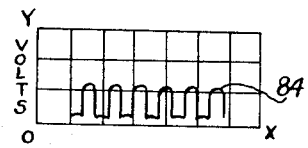
Fig. 6 is a graph illustrating the wave form obtained in the generating system of Fig. 5 for the energizing current supplied to the load relay magnet coil.

Fig. 6 is a graph in which the curve 84 represents the wave form of the energizing current obtained in the load relay coil 41 of the generating system 80. The curve 84 is substantially the same as the curve 77 shown in Fig. 3 for the system 10.

Figs. 7 and 9 of the drawings show generating systems 85 and 86 which are similar to the systems 10 and 80 of Figs. 1 and 5, respectively, in that the load relay coil 41 is energized from the alternator 11 by an energizing circuit which extends through the control resistors of the unit 20 and through portions of the power rectifier 12. The systems 85 and 86 differ from the systems 10 and 80, however, in that the unit 20 comprises a relatively smaller number of the control resistors and is shown in these systems as consisting of two such control resistors 44 and 46 disposed in parallel and having a common terminal 47 on one side thereof and being connected on the other side thereof with the phase windings 22 and 24 of the alternator through the conductors 50 and 52.

In the generating system 85, one end of the load relay coil 41 is connected directly with the common terminal 47 of the control unit 20 by the conductor 75 and the other end is connected with the direct current load terminal 37 of the power rectifier 12 through the conductor 76 and through the common ground G. Thus in the system 85, the cells 31ª, 31ᵇ and 31ᶜ of the power rectifier 12 are conducting cells and are included in the load relay coil circuit in series with the phase windings, whereas the cells 30ª, 30ᵇ and 30ᶜ are blocking cells which prevent energization of the load relay coil from the battery 14 when the load relay contacts 15 and 16 have been closed.

In the generating system 86, one end of the load relay coil 41 is connected with the common terminal 47 of the control unit 20 by the conductor 75 and the other end of this coil is connected with the power rectifier through a portion of the load conductor 13 which is represented in the schematic wiring diagram of Fig. 9 by the conductor arm 13ª. Thus, in the generating system 86 the cells 30ª, 30ᵇ and 30ᶜ are conducting cells and are in the load relay coil circuit, whereas the cells 31ª, 31ᵇ and 31ᶜ act as blocking cells which prevent energization of the load relay coil from the battery 14 when the load relay contacts 15 and 16 have been closed.

Figs. 8 and 10 are graphs in which the curves 87 and 88 represent the wave form of the energizing current obtained in the load relay coil 41 in the generating systems 85 and 86, respectively. The curves 87 and 88 have been plotted in the same manner as the curve 77 of Fig. 3, but have a somewhat different form because of the different voltage values effective in the load relay coil during different portions of the cycle of operation of the alternator 11.

From the accompanying drawings and the foregoing detailed description, it will now be readily understood that this invention provides an alternator-rectifier generating system of a kind suitable for use on a vehicle and in which energization of the load relay magnet coil is obtained from the alternator, such that the load relay is under the control of the alternator and such that this desired result is obtained in a very practical and inexpensive manner by connection of the load relay magnet coil circuit with phase windings of the alternator through control resistors and through portions of the power rectifier. It will now also be seen that in the energizing circuit thus provided for the load relay coil, certain of the cells of the power rectifier are conducting cells while other cells serve as blocking cells to prevent energization of the load relay coil from the storage battery of the external load circuit.

Although the generating systems of the present invention have been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In an alternator-rectifier generating system, an alternator, a power rectifier, an external direct-current load circuit connected with said alternator through said power rectifier and including a storage battery to be charged, a load relay having a magnet coil and series switch contacts controlling said load circuit, said contacts being normally open and adapted to be closed in response to energization of said magnet coil, resistor means, and circuit means connecting said magnet coil with said alternator through said resistor means and one portion of said rectifier for causing automatic closing of said switch contacts in response to operation of the alternator, the remaining portion of said rectifier being effective to prevent energization of said magnet coil from said battery through said switch contacts when the latter have been closed by the action of said alternator.

2. In an alternator-rectifier generating system, an alternator having three-phase inductor windings, a three-phase full-wave power rectifier connected with said phase windings and having direct-current load terminals, an external direct-current load circuit connected with said load terminals, a load relay having a magnet coil and series switch contacts controlling said load circuit, said contacts being normally open and adapted to be closed in response to energization of said magnet coil, control resistors, and circuit means connecting said magnet coil with phase windings of the alternator through said control resistors and through portions of said power rectifier for causing such energization of said magnet coil and closing and opening of said contacts in response to operation of the alternator.

3. In an alternator-rectifier generating system, a polyphase alternator having inductor phase windings, a power rectifier having direct-current load terminals, an external direct-current load circuit connected with said load terminals, a load relay having a magnet coil and series switch contacts controlling said load circuit, said contacts being normally open and adapted to be closed in response to energization of said magnet coil, a plurality of control resistors, and circuit means connecting one end of said magnet coil directly with one of said load terminals and connecting the other end with the other of said load terminals through circuit means comprising said control resistors in series with phase windings of the alternator and portions of said rectifier.

4. In an alternator-rectifier generating system, a three-phase alternator, a full-wave power rectifier having direct-current load terminals and comprising three circuit arms in parallel and containing rectifier cells, said alternator having inductor phase windings connected with the respective circuit arms of said power rectifier, an external direct-current load circuit connected with said load terminals and including a storage battery, a load relay having a magnet coil and series switch contacts located in and controlling said load circuit, said switch contacts being normally open and adapted to be closed in response to energization of said magnet coil, control resistor means comprising a plurality of resistor elements, and circuit means connecting said magnet coil for energization from said alternator with said magnet coil in series circuit with said phase windings and said resistor elements through certain of the cells of said rectifier when said alternator is being driven, other cells of said rectifier being effective as blocking cells to prevent energization of said magnet coil from said battery when said switch contacts have been closed while the alternator is not being driven or whenever the battery terminal voltage exceeds the alternator output voltage available at said load terminals.

5. In an alternator-rectifier generating system, a polyphase alternator having inductor phase windings, a multiple-cell power rectifier having direct-current load terminals, an external direct-current load circuit connected with said alternator through said power rectifier, a load relay having a magnet coil and series switch contacts controlling said load circuit, said switch contacts being normally open and adapted to be closed in response to energization of said magnet coil, control resistor means comprising a plurality of resistor elements disposed in parallel and having a common terminal on one side thereof and on the other side thereof having individual terminals connected with one of said load terminals through phase windings of said alternator and through certain of the cells of said rectifier, and circuit means connecting one end of said magnet coil with said common terminal and the other end with said one of said load terminals.

6. An alternator-rectifier system as defined in claim 5 in which said control resistor means consists of two resistor elements in parallel having one common terminal on one side thereof and on the other side thereof having two individual terminals respectively connected with two of the phase windings of said atlernator, said magnet coil being connected in circuit with said alternator by having one end thereof electrically connected with said one common terminal and its other end electrically connected with said one direct-current load terminal through phase windings of the alternator and through certain cells of said rectifier.

7. An alternator-rectifier system as defined in claim 5 in which said control resistor means consists of two resistor elements in parallel having one common terminal on one side thereof and on the other side thereof having two individual terminals respectively connected with two of the phase windings of said alternator, said magnet coil being connected in circuit with said alternator by having one end thereof electrically connected with said one common terminal and its other end electrically connected with said one direct-current load terminal through phase windings of the alternator and through certain cells of said rectifier, said load circuit including a battery to be charged, certain of the cells of said rectifier being included in the magnet coil circuit as conducting cells when said alternator is being driven and other cells of said rectifier being blocking cells which prevent energization of said magnet coil from said battery when said switch contacts have been closed while the alternator is not being driven or whenever the battery terminal voltage exceeds the alternator output voltage available at said load terminals.

8. In an alternator-rectifier generating system, a three-phase alternator having inductor windings for the respective phases, a full-wave power rectifier having direct-current terminals and comprising connected circuit arms each containing two rectifier cells, said phase windings being connected with said circuit arms at junction points located between the rectifier cells thereof, an external direct-current load circuit connected with said alternator through said power rectifier, a load relay having a magnet coil and series switch contacts located in and controlling said load circuit, said switch contacts being normally open and adapted to be closed in response to energization of said magnet coil, control resistor means comprising three resistor elements disposed in parallel and having a common terminal on one side thereof and on the other side thereof having individual terminals, circuit means connecting said individual terminals with one of said load terminals through phase windings of said alternator and through the rectifier cells located on one side of said junction points, and circuit means connecting one end of said magnet coil with said common terminal and the other end with said one of said load terminals.

9. A generating system as defined in claim 8 in which the load circuit includes a battery to be charged, and in which the cells of said rectifier located on the other side of said junction points are blocking cells which prevent energization of said magnet coil from said battery when said switch contacts have been closed.

References Cited in the file of this patent

UNITED STATES PATENTS

| | | |
|---|---|---|
| 2,520,689 | Niemi | Aug. 29, 1950 |
| 2,646,543 | Gilchrist | July 21, 1953 |
| 2,651,749 | Weber | Sept. 8, 1953 |

FOREIGN PATENTS

| | | |
|---|---|---|
| 608,856 | Great Britain | Sept. 22, 1948 |
| 110,548 | Australia | May 7, 1940 |